US009054911B1

(12) United States Patent
Glover et al.

(10) Patent No.: US 9,054,911 B1
(45) Date of Patent: Jun. 9, 2015

(54) MULTICAST GROUP INGESTION

(75) Inventors: Michael A. Glover, Durham, NH (US);
Michael Todd Joseph, San Francisco, CA (US); Carlo Contavalli, Millbrae, CA (US); Nils Oliver Krahnstoever, Brookline, MA (US); Thomas Edward DeWeese, Boxborough, MA (US); Harold Jason Schiller, Silver Spring, MD (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/448,338

(22) Filed: Apr. 16, 2012

(51) Int. Cl.
*G06F 15/16* (2006.01)
*H04L 29/06* (2006.01)

(52) U.S. Cl.
CPC ................................ *H04L 29/06176* (2013.01)

(58) Field of Classification Search
CPC ......... H04L 29/00; H04L 12/00; H04L 45/00; H04L 67/1031; H04L 67/1034; H04L 65/4076; H04L 67/1002; G06F 15/16
USPC .................. 709/231, 217, 218, 219, 234, 235
See application file for complete search history.

(56) References Cited

U.S. PATENT DOCUMENTS

| 6,442,588 | B1 * | 8/2002 | Clark et al. ................. 709/203 |
| 8,327,017 | B1 * | 12/2012 | Trost et al. ................. 709/238 |
| 8,385,190 | B2 * | 2/2013 | Smith et al. ................. 370/221 |
| 8,447,862 | B2 * | 5/2013 | Sakata et al. ................. 709/226 |
| 8,745,221 | B1 * | 6/2014 | Willbanks ................. 709/224 |
| 2007/0214359 | A1 * | 9/2007 | Williamson ................. 713/163 |
| 2008/0075285 | A1 * | 3/2008 | Poli et al. ................. 380/211 |
| 2008/0159141 | A1 * | 7/2008 | Soukup et al. ................. 370/235 |
| 2009/0228933 | A1 * | 9/2009 | Asbun et al. ................. 725/63 |
| 2010/0088426 | A1 * | 4/2010 | Takemura et al. ................. 709/231 |
| 2011/0075599 | A1 * | 3/2011 | Liao et al. ................. 370/312 |
| 2011/0314119 | A1 * | 12/2011 | Kakadia et al. ................. 709/213 |
| 2012/0230201 | A1 * | 9/2012 | Thota et al. ................. 370/241 |
| 2013/0159487 | A1 * | 6/2013 | Patel et al. ................. 709/223 |
| 2013/0219423 | A1 * | 8/2013 | Prickett et al. ................. 725/32 |

* cited by examiner

*Primary Examiner* — Brian J Gillis
*Assistant Examiner* — Steve Lin
(74) *Attorney, Agent, or Firm* — Amin, Turocy & Watson, LLP

(57) ABSTRACT

A system and method for processing multicast streams is disclosed. A router receives the multicast streams and communicates the streams via communication tunnels to a set of ingestion pipelines. Each communication tunnel can be terminated upon the ingestion pipeline receiving a multicast stream. The set of ingestion pipelines process and deliver the multicast streams across existing IP infrastructure for real time distribution.

23 Claims, 10 Drawing Sheets

US 9,054,911 B1

MULTICAST GROUP INGESTION

TECHNICAL FIELD

This disclosure relates generally to multicast streaming, and in particular to receiving and processing multicast streams through a router to ingestion pipelines for distribution in real time.

BACKGROUND

Live streaming current events over the Internet increases the demand for qualitative and reliable multicast streaming infrastructure. As the events can be viewed in real-time, minor glitches in the audio and/or video feeds can become noticeable. Live streaming feeds are commonly used in such circumstances as major political speeches and events, sporting events, and other cultural happenings, for example, in which a viewing audience is relying on the live streaming feed to be functioning with excellence. Multicast streams such as these and others having video, audio or other data are often not able to be reliably transported privately.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Mission critical live streaming on the web is done today by building redundancy by having separate hardware and/or software encoders pushing roughly equivalent streams to be redundantly encoded. This encoding takes place in separate encoding pathways that produce redundant streams. Failovers, automatic switches to redundant pathways or streams, attempt to minimize disruptions, but since they use discrete and/or diverse components, glitch free failovers are generally difficult and not reliably executed from multicast streaming.

Systems and methods disclosed herein relate to transporting multicast traffic across a unicast network, to a unicast endpoint even though the underlying network does not support multicast protocols, and enabling load sharing of traffic. This is accomplished by leveraging the pre-existing load balancing capabilities of a set of load balancer components in conjunction with routers that open communication tunnels to particular ingestion endpoints. The load balancer components are configured with multicast support, and the communication tunnels have shared Anycast destination points. For example, the load balancer components support multiple, overlapping address spaces.

In one example of an embodiment, a system comprises a memory that stores computer executable components. A processor executes the computer executable components stored in the memory. A set of ingestion pipelines process and deliver multicast streams for real time distribution. A router receives multicast streams and generates communication tunnels to the set of ingestion pipelines, in which each tunnel can carry one or more streams. The communication tunnels can be unicast Generic Routing Encapsulation tunnels, which can be encrypted, for example.

An advertising component communicates membership reports to the router, in which the membership reports indicate a status of a set of load balancer components for the set of routers to transmit the multicast streams to via a set of first communication tunnels. A set of ingestion agents receive the multicast streams from the set of load balancer components via a set of Generic Routing Encapsulation tunnels based on a forwarding table, and aggregate the multicast streams received into stream segments to distribute for real time distribution.

Another example of an embodiment includes a system comprising a set of routers that receive multicast streams in response to communicating an initial request and a set of advertising components that communicates membership reports to the set of routers. The set of routers transmit, via a set of first communication tunnels, the multicast streams to a set of load balancer components based on the membership reports indicating a status of the set of load balancer components. A set of ingestion agents receive the multicast streams from the set of load balancer components via a set of second communication tunnels based on a forwarding table, and aggregate the multicast streams received into stream segments.

In one embodiment, a connection with communication tunnels in a virtual router is provided by the system to one or more external entities or media sources. This enables both a unicast source IP address and a multicast group address in use by one partner to not collide with use by another partner. In the event that multiple external entities or media sources stream different content (e.g., multicast content) to the same multicast group, the back end infrastructure can choose which traffic is desired by crafting a join for a given multicast group, and encapsulates the traffic in a tunnel packet, which is then associated with only the virtual instance of the external entity whose traffic the back end desires.

Also disclosed herein is a method including using a processor to execute computer executable instructions stored in a memory to perform acts. The acts comprise receiving multicast streams at a set of routers, and communicating, via a set of advertising components, membership reports to the set of routers, the membership reports indicating a status of a set of load balancer components for processing the multicast streams. The method includes receiving the multicast streams at the set of load balancer components via a set of first communication tunnels, which are established between the set of routers and the set of load balancer components based on the membership reports received by the set of routers.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Overview

Figure 1:
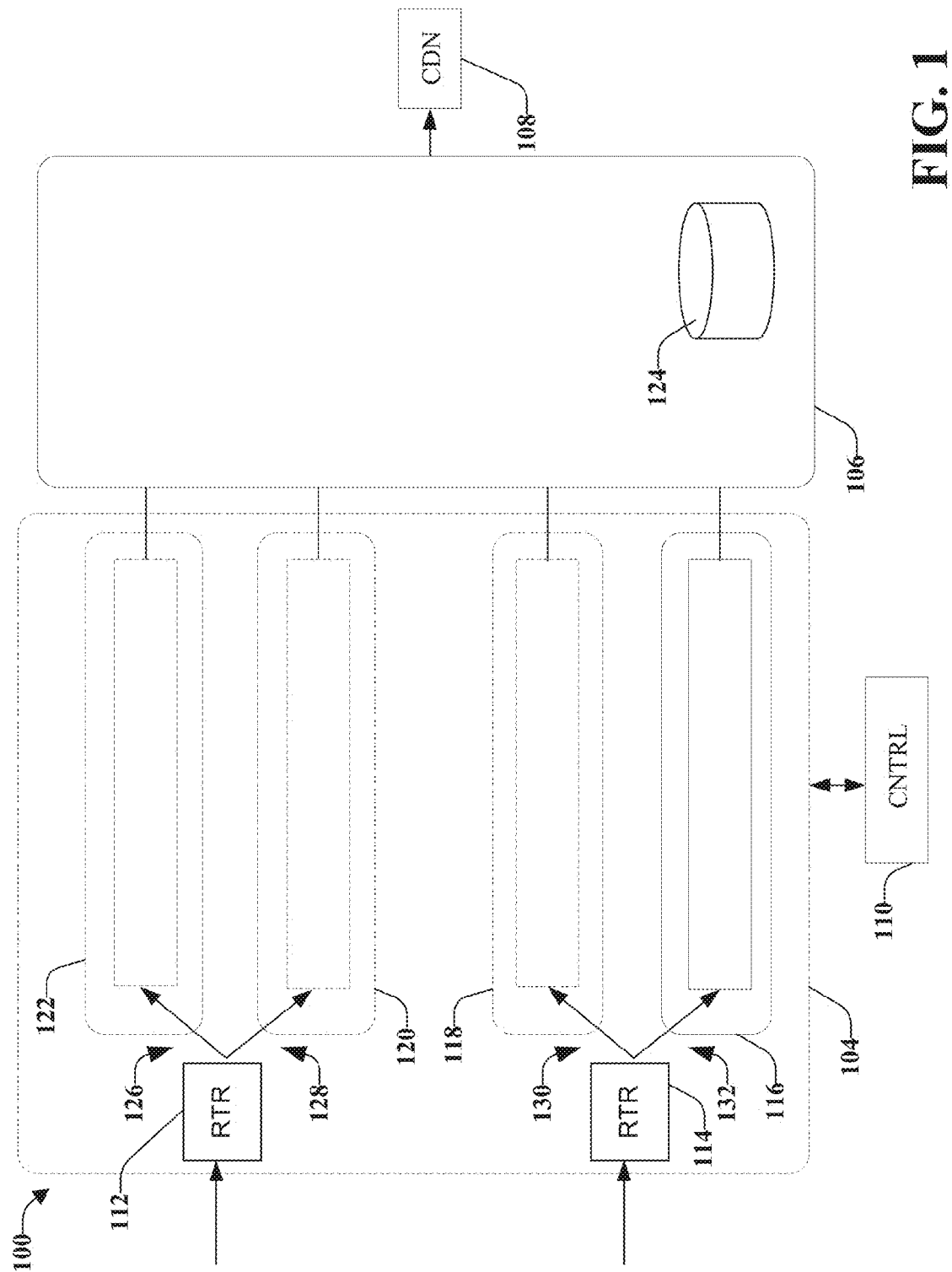
FIG. 1 is a block diagram illustrating an example, non-limiting embodiment of a live streaming infrastructure in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

It is to be appreciated that in accordance with one or more implementations described in this disclosure, live streaming input streams, such as multicast User Datagram Protocol (UDP) streams can be coherently processed in parallel ingestion pipelines. If errors occur during the ingestion and/or processing of the input stream, the live streaming and ingestion infrastructure can switch between the parallel input streams to provide reliable live streaming feeds to a content distribution network, storage, and/or destination address, for example.

Internet Protocol (IP) multicast is a technique for one-to-many communication over an IP infrastructure in a network. IP multicast scales to a larger receiver population by not requiring prior knowledge of whom or how many receivers exist. Multicast uses network infrastructure efficiently by requiring the source to send a packet only once, even if it needs to be delivered to a large number of receivers. One transport layer protocol to use multicast addressing is User Datagram Protocol (UDP). However, UDP is not reliable—messages are not inherently acknowledged and may be lost or delivered out of order. Further, UDP packets do not guarantee delivery of packets, or defend against unauthorized interception. Furthermore, the large state requirements in routers make applications using a large number of network trees unworkable using IP multicast. Take presence information as an example where each router keeps at least one tree of its subscribers, if not several. Few, if any mechanisms, have demonstrated what would allow the IP multicast model to scale to millions of senders and millions of multicast groups and, thus, make fully general multicast applications practical As disclosed herein, methods and systems enable moving and delivering multicast UDP packet streams across existing IP networks, without requiring that the intervening IP network components support the IP Multicast protocol suite. The system is robust against the failure of network components, and provides a framework for correcting packet loss and defending against unauthorized interception.

For example, various routers receive a multiplicity of live multicast streams that are, for example, IP multicast UDP streams enclosing MPEG-2 Transport Stream (M2TS). Based on membership reports of ingestion pipelines, the routers transport the multicast streams to the ingestion pipelines for processing and distribution for user subscriber viewing. For example, a router receives multicast streams and communicatively connects via communication tunnels to a set of ingestion pipelines, in which multiple tunnels can deliver via the same pipeline to spread traffic across available links and reduce displacements in response to failed links.

The ingestion pipelines include a set of load balancer components that process and distribute the multicast streams through the ingestion pipeline. The membership reports received by the routers include a status of the load balancer components and can comprise Internet Group Management Protocol (IGMP) multicast group membership reports. For example, the load balancer components, if healthy or good status, can send IGMP membership reports to the routers, corresponding to the multicast streams that the load balancer components select to receive. The routers respond to the membership reports messages by sending the corresponding multicast stream via a preconfigured tunnel. The communication tunnel from the router, which carries one or more multicast streams, terminates at the load balancer components.

An advertising component communicates the membership reports to the routers. A set of ingestion agents of the ingestion pipelines further receive the multicast streams from the set of load balancer components in a second communication tunnel via a set of Generic Routing Encapsulation tunnels based on a forwarding table. The ingestion agents further operate to aggregate the multicast streams received into stream segments for further real time distribution, for example.

Referring now to the drawings, FIG. 1 illustrates a block diagram of an example of a multicast stream ingestion system 100 in accordance with various aspects and implementations is shown. Live streaming infrastructure of the system 100 can be provided to ingest and/or process live media feeds and distribute them to media players, media storage, content distribution networks and the like, for example.

The system can include ingestion infrastructure 104, origin infrastructure 106, a content distribution network 108, and a stream/event controller operable as an application programming interface (API) 110. Ingestion infrastructure 104 can receive incoming media feeds, such as multicast IP streams and redundantly process multicast streams in separate pipelines. Origin infrastructure 106 can save the live media streams to memory, and prepare the live streams for delivery to the content distribution network 108, which can deliver live media streams to media players, a storage, a distribution network, or other destinations. The stream control 110, for example, can give broadcasting partners the ability to start and/or stop an event, configure monetization settings, and in general manage the set of stream processing events and their lifecycle.

The ingestion system 100 includes parallel ingestion pipelines 116, 118, 120 and 122. In the ingestion infrastructure 104, media streams are received at ingestion entry points such as routers 112 and 114 that reside at the edge of the network. The media streams can include, for example, video streams, financial data streams, audio streams and the like, which are comprised of a multicast UDP stream format. Once received, the media streams are ingested and processed by the parallel pipelines 116, 118, 120 and 122. The streams can then be eventually saved to a memory 124 in the origin infrastructure 106, for example, before being distributed via a content distribution network 108.

The ingestion entry points or routers 112 and 114 can receive multicast signals acquired through a network of ingestion servers. The ingestion entry points or routers 112 and 114 can also receive the live media streams from other sources commonly used for delivering multicast streams having live media feeds, for example. Once redundant live multicast streams are received at the routers 112 and 114, parallel ingestion pipelines 116, 118, 120 and 122 can ingest and process the multicast streams in parallel. It is to be appreciated that while FIG. 1 depicts pipelines 116 and 118 processing live streams from the network edge router 114, and pipelines 120 and 122 are processing live streams from the network edge router 112, there can be any combination of pipelines and entry points. In some embodiments, there can be fewer or greater than two parallel pipelines per entry point, and in other embodiments, there can be more or less than two entry points.

Ingestion pipelines 116, 118, 120 and 122 can process and prepare the live streams for delivery, in which, for example, can be to the content distribution network 108, but can be to any destination network. Processing modules such as load balancer components, advertising components, and ingestion agents can be included in the ingestion pipelines 116, 118, 120 and 122. These modules can operate in the pipelines to transport multicast traffic across a unicast network, such as the system 100, to a unicast end point, which does not cause massive fan out for a one-to-many communication, but still enables the streams to be distributed for user subscriber viewing and/or general viewing. The ingestion pipelines can also include packager and/or encryption components to package the stream into a container format and/or encrypt it.

The routers 112 and 114 operate to duplicate copies of redundant live media streams from an external entity or media source, for example, and operate to generate communication tunnels 126, 128, 130, 132 to load balancer components in pipelines 116, 118, 120 and 122. For example, each communication tunnel is a Generic Routing Encapsulation tunnel, in which multiple tunnels can correspond to each load balancer, to allow traffic to be evenly divided between the remaining load balancers upon failure. The load balancer component receives the media stream (e.g., a video stream) and terminates the communication tunnel thereafter. The routers 112 and 114 are configured to float the end points of the communication tunnel generated. As a result, the load balancer components are operable to terminate the communication tunnels, for example, by shifting the end point of the communication tunnel back to the respective router 112 or 114, which has tunneled communication thereto.

In embodiments herein, multiple edge routers are peered together with any number of outside partner networks to request and receive multicast UDP streams, in which the outside partners are casting sources for the multicast UDP streams. The arrangement of parallel ingestion pipelines scales robustness of the system at all layers, from ingestion of the source material to encoding, storage, conversion into on-demand assets, publishing, and streaming for work load sharing.

Because multicast IP streams have inherent problems with routing to particular addresses, the routers 112 and 114 generate particular tunnels to each pipeline 116, 118, 120 and 122 to be forwarded by a set of load balancer components that terminate and share the address with one or more advertising components that advertise to the routers on behalf of the load balancing components. The pipelines 116, 118, 120 and 122 replicate and forward the multicast UDP streams in UDP packets, which can carry M2TS video data, for example, for user viewing in a unicast transmission of a unicast pipeline.

Figure 2:
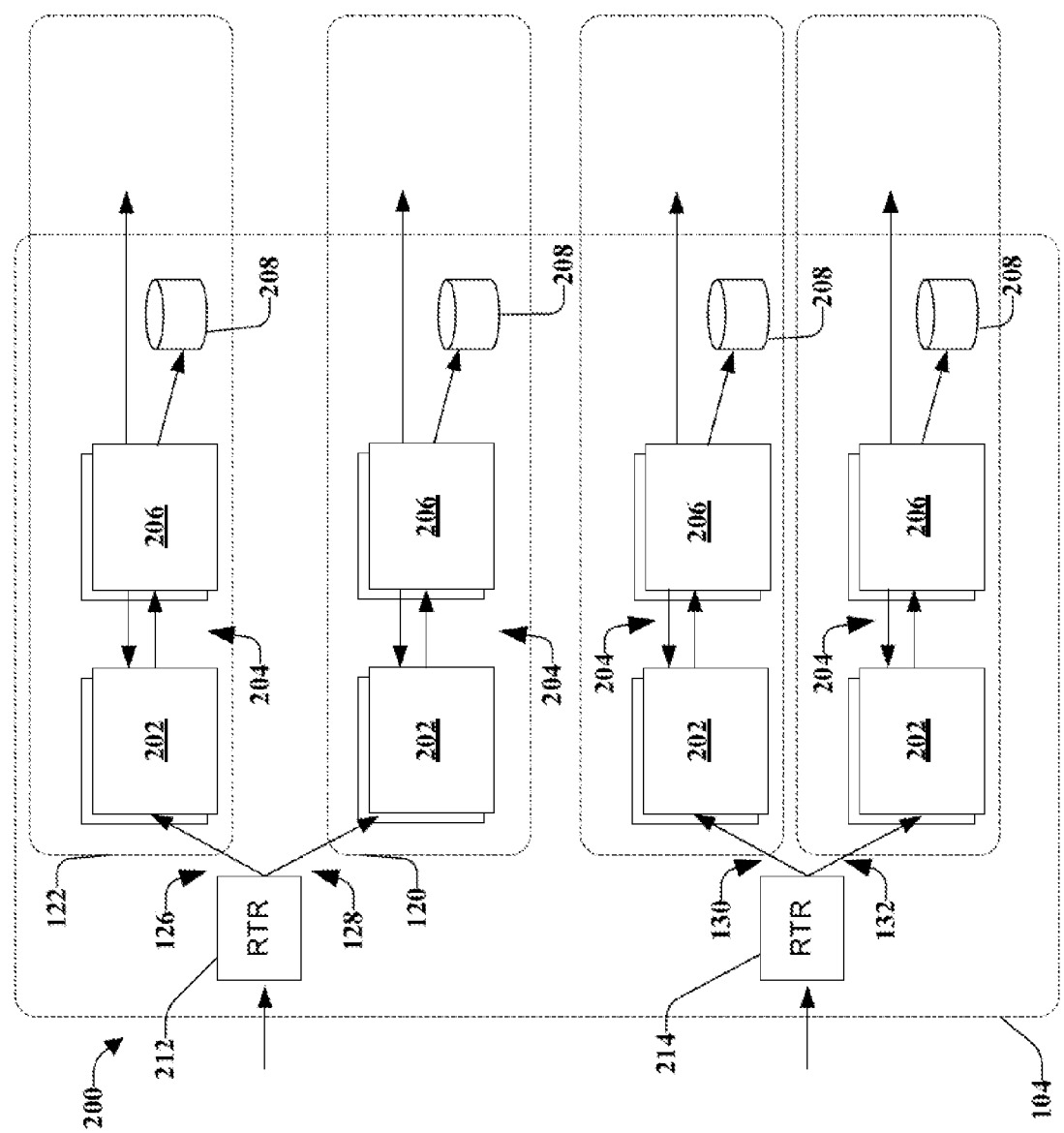
FIG. 2 is a block diagram illustrating an example, non-limiting embodiment of a redundant ingestion system with parallel ingestion pipelines in accordance with various aspects and implementations described herein.

Referring now to FIG. 2, illustrated is system 200 that operates to process multicast groups of multicast streams into various ingestion pipeline entry points that is robust against failure of network components. Routers 212 and 214 operate as edge routers that receive an external multicast UDP stream, in which the multicast stream can be video streaming, audio streaming, financial streaming and the like media data streams, which are not limited to any one particular example described herein for ease of description. The routers 212 and 214 can include multiple routers or be limited to only one as intended by the term a set, in which a set can be considered one or more.

The routers 212 and 214, for example, operate with a loopback path that operates for multiple loop balancing tunnels. The routers 212 and 214 peer with any number of external multicasting sources and can request multicast UDP streams, such as multicast UDP video streams. The routers 212 and 214 can receive IGMP packets from an advertising component (not shown) on a Generic Routing Encapsulation (GRE) tunnel. The GRE tunnels can be shared with corresponding sets of load balancing components and can be encrypted (e.g., Internet Protocol Security (IPSEC)) to defend the multicast UDP packet streams against unauthorized interceptions. The routers 212 and 214 can forward requests for multicast streams using an initial request format, such as Protocol Independent Multicast (PIM), which is a protocol format used by the routers 212 and 214 to span intermediate hops between the multicast stream source and a destination (e.g., a user viewing device, storage, distribution network, etc.). The routers 212 and 214 additionally forward multicast UDP media data packets from the external source to a set of load balancer components 202 via a set of first communication tunnels 126, 128, 130, and 132 generated by the routers, such as GRE tunnels or other like tunneling protocols.

Each ingestion pipeline 116, 118, 120 and 122 includes the set of load balancer components 202, a set of ingestion agents 204 and a storage component 206. The ingestion pipelines 116, 118, 120 and 122 transports multicast streams across a unicast network, to a unicast endpoint, which does not cause massive fan out, and enables load sharing of traffic. This is accomplished by leveraging the load balancing capabilities of the load balancing components, adding multicast support, and building tunnels that have a shared Anycast destination.

For example, the set of load balancer components 202 are configured to receive the multicast UDP streams via each GRE tunnel configured by the routers 212 and 214 and an Anycast Virtual Internet Protocol (VIP) address. The routers 212 and 214 receive IGMP multicast group membership reports that have a status corresponding to each of the load balancer components 202. Based on the reports, the routers 212 and 114 open the communication tunnels 126, 128, 130, 132 with floating end points to the respective load balancer components 202, and communicate multicast UDP streams to the load balancer components having an available, good or functional status. Each status indicator for the load balancer components indicates whether the load balancer component is operable to receive and process multicast streams. In addition, the edge routers 212 and 214 are configured to assign an Anycast VIP for each channel, so that each communication tunnel that is generated from the router and a load balancer component has a different Anycast VIP address.

The load balancer components 202 are operable to terminate the communication tunnels 126, 128, 130, and/or 132. For example, by shifting the end point of the communication tunnel back to the respective router 212/214, which has tunneled the communication, the load balancer component can terminate the communication tunnel generated for the particular load balancer component. Each pipeline 116, 118, 120 and 122 includes the set of load balancer components 202 that operate to distribute workload throughout the pipeline. For example, the load balancer components 202 are configured to poll other components and populate a forwarding table that indicates capabilities of the polled components within the ingestion pipeline and forward workload (e.g., multicast UDP packets) for processing through the system. The load balancer components 202 can forward the multicast UDP packet streams based on the forwarding table generated.

A set of second communication tunnels 204 are opened between the set of load balancer components 202 and a set of ingestion agents. These communication tunnels 204 can also comprise GRE tunnels that can transport the load balanced multicast UDP streams (e.g., live video streams) and encapsulate the packets of the streams in an encrypted transport protocol (e.g., IPSEC). The set of communication tunnels 204 can also be unicast channels with a floating end point, similar to the set of first communication channels described above.

The load balancer components 202 transport workload (e.g., multicast UDP live video streams) according to a forwarding table that is populated based on polling operations performed at the load balancer components 202. The load balancer components 202 deliver multicast streams in response to polling responses to ingestion agents, for example. Using multiple load balancer components 202 with load balancing, instead of a single component, can increase reliability through redundancy.

To poll the set of ingestion agents 206, the set of load balancer components 202 of each ingestion pipeline receives requests and/or status reports having status indications of the set of ingestion agents 206. The status reports can be received based on a poll signal communicated by the set of load balancer components 202. The polling communication can comprise a Remote Procedure Call (RPC) communication, for example, that is an inter-process communication that enables a subroutine or procedure to be executed in another address space at respective ingestion agents 206. The set of load balancer components 202 polls the ingestion agents 206 with a polling interval for response from the ingestion agents 206. The polling interval, for example, is one second, which can be variable and not fixed. The polling communication initiates the ingestion agents to respond with an amount and which multicast groups of multicast UDP streams that the ingestion agents desire, or are capable of handling. The intelligence of this protocol is controlled by a stream event manager component and a controller, which is further discussed infra. In addition or alternatively, the ingestion agents are operable to request workload capacity without polling and upon availability, capability and/or any event trigger other than polling initiated communication.

In one embodiment, a connection with communication tunnels in a virtual router is provided by the system to one or more external entities or media sources. This enables both a unicast source IP address and a multicast group address in use by one partner to not collide with use by another partner. In the event that multiple external entities or media sources stream different content (e.g., multicast content) to the same multicast group, the back end infrastructure can choose which traffic is desired by crafting a join for a given multicast group, and encapsulates the traffic in a tunnel packet, which is then associated with only the virtual instance of the external entity whose traffic the back end desires. Thus, the ingestion pipelines with the communication tunnels can enable both a unicast source IP address and a multicast group address, and encapsulates communication tunnel packets differently according to the multiple different multicast group address domains.

Each load balancer component 202 is configured to receive the responses or requests from the ingestion agents. Upon receiving the responses, each load balancer component 202 populates a forwarding list that maintains statistics related to the set of ingestion agents for workload distribution via the set of second GRE communication tunnels 204. Based on the forwarding tables, the set of load balancer components 202 forward multicast packets to the set of ingestion agents 206. The responses or requests from the ingestion agents 206, for example, include a list of multicast groups, in which each of the ingestions agents can receive. Multiple load balancer components 202 can receive the lists, but only a certain number (e.g., one at a time) will deliver the workload traffic (e.g., multicast packet stream) to a given ingestion agent 206. The particular load balancer(s) that respond to the requests/responses can change depending upon communication and coordination among the set of load balancers for a particular ingestion pipeline. Therefore, in response to one or more load balancers failing, redundancy is built into the system so that other load balancers of the set of load balancers assume the duties and workload of the failed load balancer. Processing can thus be distributed among the load balancer components 202.

The set of ingestion agents 206 of each ingestion pipeline operate to associate or assign a stream identifier (ID) to the multicast group packets received from a load balancer component 202. For example, an ingestion agent 206 receives multicast packets and uses a destination multicast group IP address to associate the stream with a stream ID. Each ingestion agent 206 further aggregates the multicast UDP packets into chunks and forward the stream data (e.g., media streams and metadata) to a user player component, storage 208, and/or a live real time distribution infrastructure or origin infrastructure. The storage 208, for example, can include ingestion agent queues and or chunk buffers that store chunks or stream segments from the agent queues therein.

Figure 3:
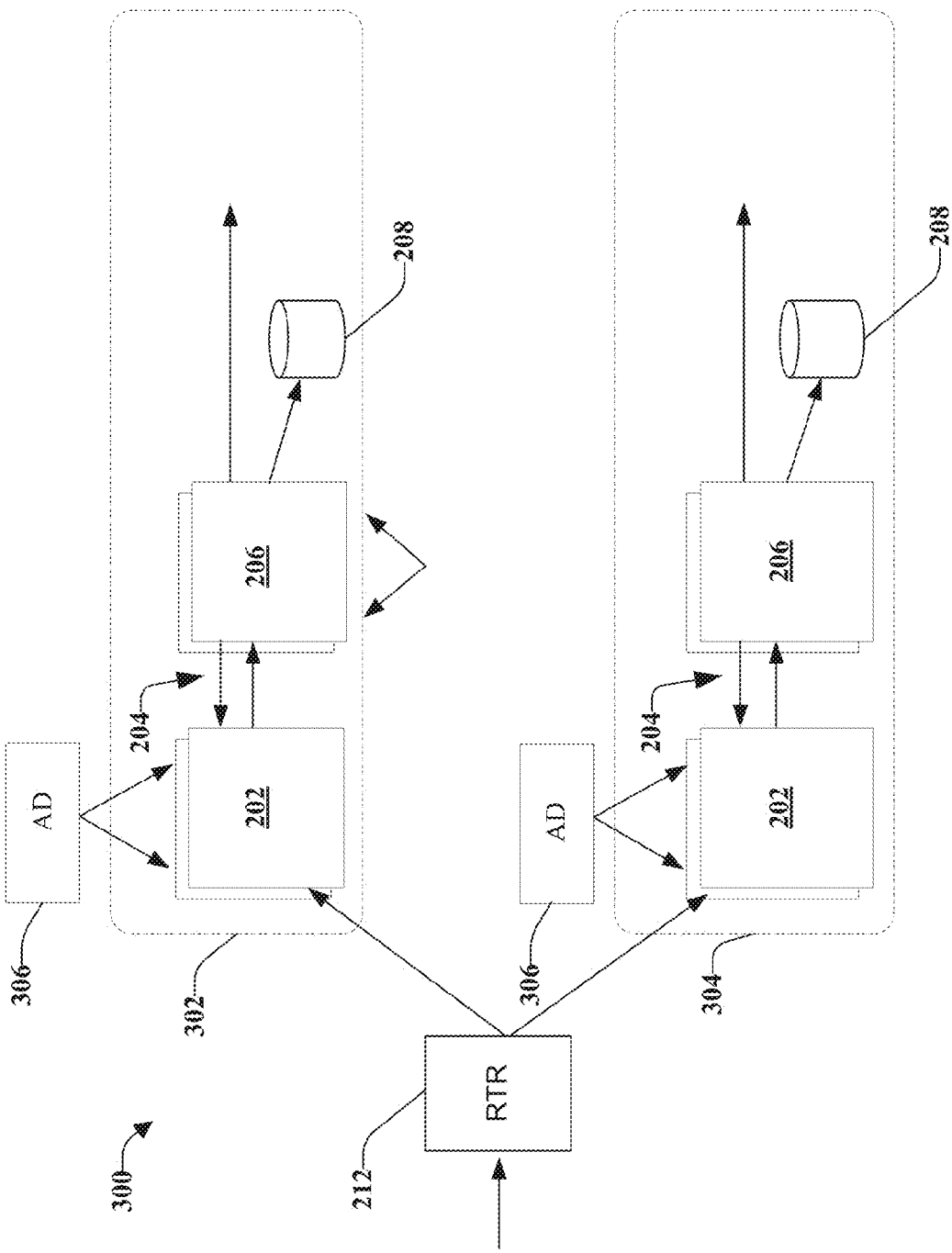
FIG. 3 is a block diagram illustrating an example, non-limiting embodiment of a multicast processing redundant ingestion system with parallel ingestion pipelines in accordance with various aspects and implementations described herein.

Referring to FIG. 3, illustrated is a further example of a system 300 that routes multicast media streams from a multicasting source through unicast channels for distribution in real time. The system 300 includes a router 212 that receives multicast UDP streams (e.g., video streams, and other data) and communicates them to different ingestion pipelines 302 and 304, for example, to be processed and forwarded for distribution.

The ingestion pipelines 302 and 312 of the system 300 respectively include a set of load balancer components 202 and a set of ingestion agents 206. The load balancer components 202 and the ingestion agents 206 are communicatively connected via communication pathway tunnels 204. The ingestion pipelines 302 and 306 include advertising components 306 operably connected to the set of load balancer components 202.

The router 212 communicatively connects with the advertising components 306 and the load balancer components 202 in order to receive media streams (e.g., multicast UDP streams) from an external source duplicating media streams for distribution. For example, a live real time video recording can be broadcasted, received by the system 300 and distributed via unicast channels with Anycast VIPs to implement the communication tunnels between the edge routers and the load balancers. If one load balancer component fails, then traffic can be redirected to any other load balancer serving the same Anycast IP destination address.

The router 212, for example, receives membership reports from the set of advertising components 306, which communicate and advertise on behalf of the set of load balancer components 202. The membership reports, for example, comprise IGMP requests or IGMP multicast group membership reports. Each group includes multicast streams for load balancer components that are capable of distributing the media streams. The router 212 receives the advertisements and initiates a request for the media streams. The requesting communications from the router 212 can include IGMP communication requests or other type communications, such as Protocol Independent Multicast (PIM) communications.

Upon receiving media streams, the router 212 opens a set of first communication tunnels (e.g., GRE or other communication tunnels) with the set of load balancers 202 based on the membership reports received by the advertising components 306. The advertising components 306 are associated with the set of load balancer agents 202 on a one to one ratio, and/or other ratios depending on workload, resources or other factors. For example, an advertising component 306 can correspond to a particular load balancer component 202 and share the same communication tunnel destination address. The tunnel is shared among the load balancer component 202 and the advertising component 306. Other ratios of load balancer components to advertising components are also envisioned.

The advertising components 306 are each associated with a set of load balancer components 202 and are configured to read information records describing the multicast groups to be requested from the router 212 (e.g., an edge router). The advertising component 306 sends, for example, IGMP packets to the router in a GRE communication tunnel to request the multicast group streams. The advertising component 306 negotiates or advertises with one or more routers (e.g., edge router 212) to ensure that multicast packets are sent from the router in a GRE tunnel, on an Anycast VIP and arrive at the corresponding load balancer component 202. In the case where a particular load balancer component 202 fails or is incapable of accepting workload, the status is detected by the advertising component 306 that corresponds to the failed load balancer component and the workload gets redistributed to other load balancer components 202. In the case where an advertising component fails or is incapable of reporting, other advertising components recognize the failed status and taking on the membership reports of the failed advertising component. Thus, the system is redundant and robust for each component associated with the ingestion pipelines and to the router residing at the edge of the system.

Figure 4:
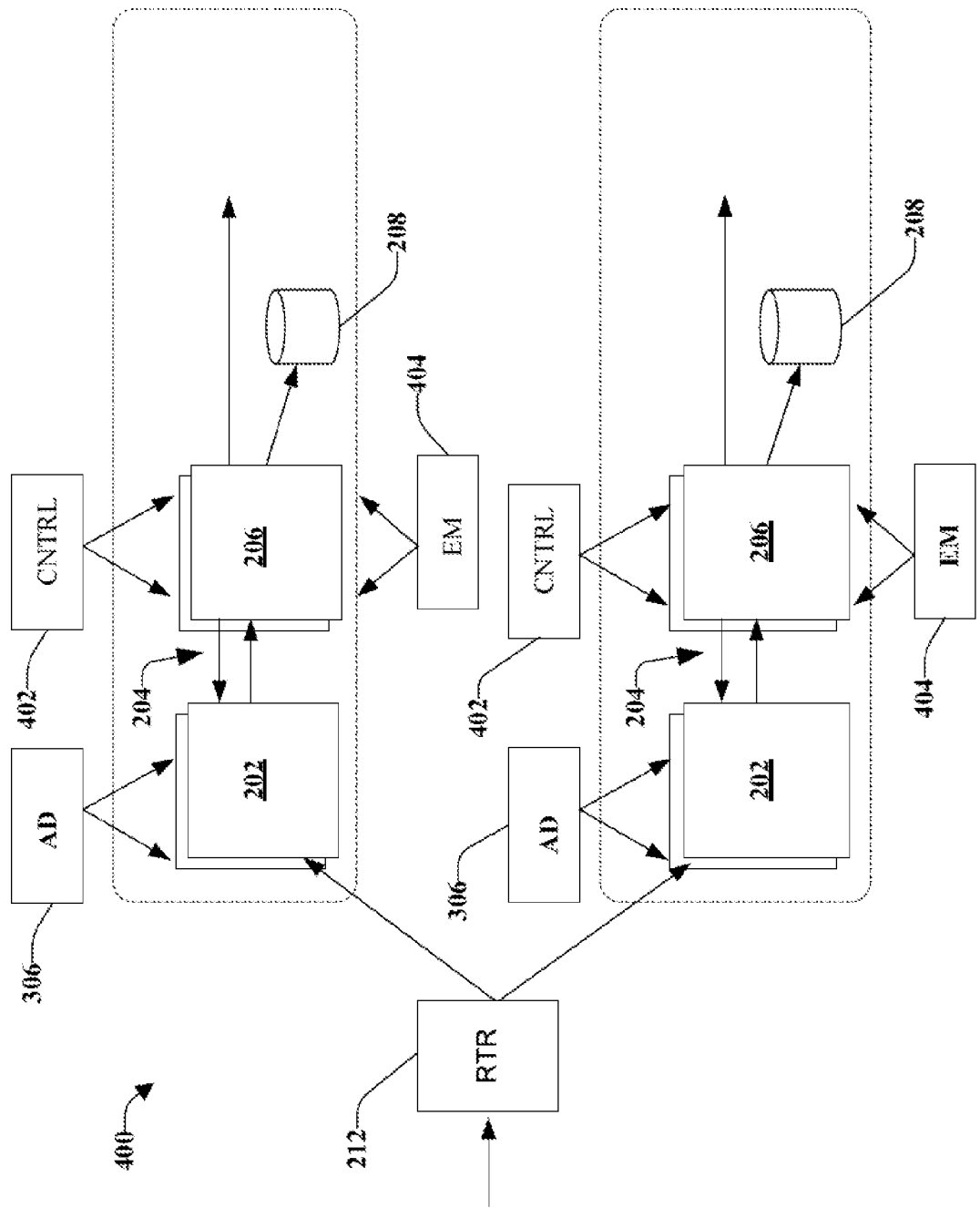
FIG. 4 is a block diagram illustrating an example, non-limiting embodiment of a multicast processing redundant ingestion system with parallel ingestion pipelines in accordance with various aspects and implementations described herein.

Referring now to FIG. 4, illustrated is a system 400 that connects multicast media streams to ingestion pipelines having unicast communication tunnels for processing the media streams. The system 400 includes one or more controllers 402 and stream event managers 404 that facilitate communications among different components of ingestion pipelines of the system.

The controller 402 communicates with the set of ingestion agents 206 using commands, such as Remote Procedure Call commands. The controller 402 is able to start and stop a stream, and add or delete a stream. Each stream has reports generated from the set of ingestion agents 206 to a stream event manager 404. The reports can include a current state, events occurring or occurred (e.g., failure events or processed events) and/or statistics related to the stream. The statistics, for example, can include a creation time, a last packet or chunk time, total bytes, a total multicast UDP packets or average size, total number of chunks, MPEG transport stream counter to detect end to end losses, a storage bytes, chunks and files written, a write error count and storage latency statistics, and the like, for example. Each ingestion agent 206 reports the multicast stream state to the stream controller 402 via the stream event manager 404 with the current state, events and statistics accumulated. Statistics are thus kept, for example, for each M2TS stream and delivered with chunks of stream data outputted by the ingestion agents 206.

Figure 5:
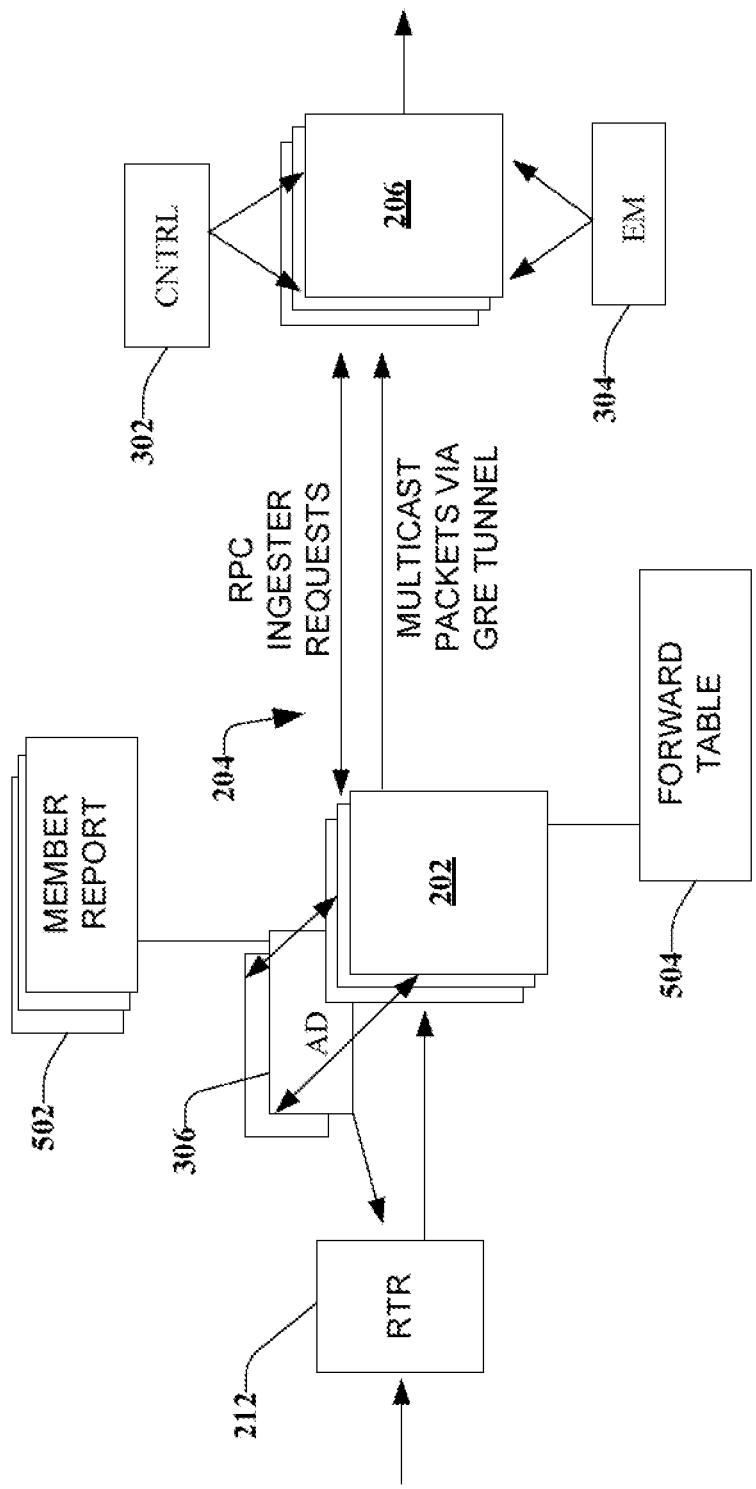
FIG. 5 is a block diagram illustrating an example, non-limiting embodiment of a system that can process multicast stream data in accordance with various aspects and implementations described herein.

Referring now to FIG. 5, illustrated is an example configuration of packet flow for an ingestion pipeline for processing multicast streams. An edge router 212 is configured to support multicast groups of multicast streams. The edge router 212 transports the multicast groups (e.g., sixty multicast streams, more or less) and associates the streams with an Anycast Virtual IP address for each stream according to the member reports 502. A set of advertising components 306 operate with a set of load balancer components 202 by advertising requests for the load balancer components 202 to the edge router 212 with the member reports 502. For example, IGMP multicast group membership reports are communicated from the advertising components 306 to the edge router to facilitate transmission of the multicast streams to the load balancer components. The edge router 212 forwards the multicast packets to the set of load balancer components 202 via a GRE communication tunnel or other like tunneling protocol, in which the GRE tunnel communication can be encrypted. The tunnel is terminated by each load balancer component 202 upon receiving the multicast streams addressed to it.

The load balancer components 202 poll the ingestion agents 206 with RPC ingester requests communications. In response to the polling, the ingestion agents 206 communicate statistic data, events and current data including multicast group IP addresses, stream IDs, and other accumulated data. Each ingestion agent 206 forwards a stream ID to a multicast group, and this data can be provided to the load balancer components 202 in order for the load balancer components to map the multicast streams to particular ingestion agents 206. After populating a forwarding table 504, the load balancer components 202 forward the multicast groups to respective ingestion agents with a second set of GRE communication tunnels or other type tunnel, which can also communicate encrypted stream data.

Figure 6:
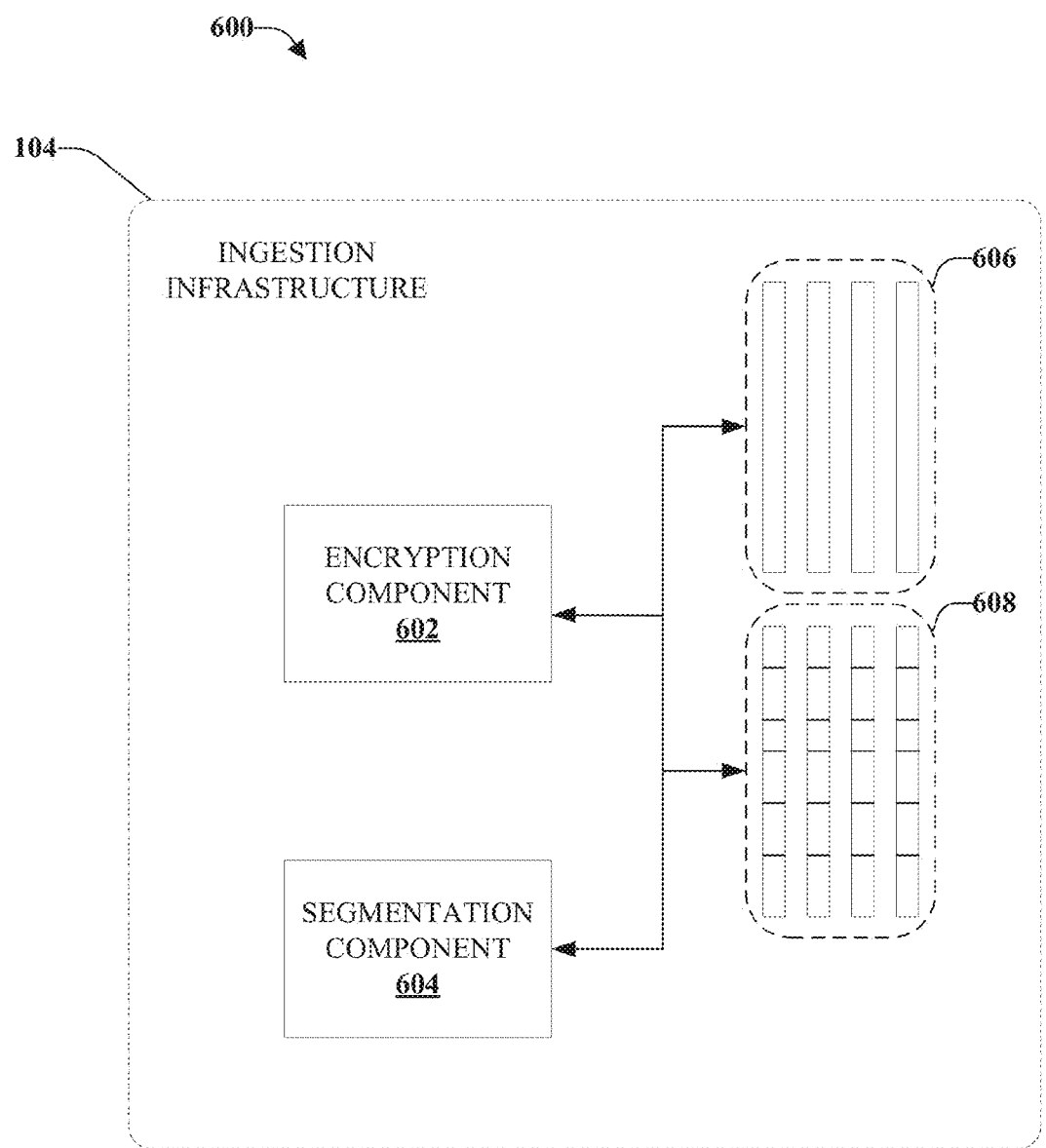
FIG. 6 is a block diagram illustrating an example, non-limiting embodiment of a system that can segment redundant streams and encrypt streams of an ingestion pipeline in accordance with various aspects and implementations described herein.

Referring to FIG. 6, illustrated is a system 600 having ingestion pipelines for receiving multicast streams (e.g., multicast video streams or the like multicast streams) and communicating the multicast streams via unicast channels of a redundant parallel infrastructure.

System 600 can include part of ingestion infrastructure 104 with an encryption component 602 and a segmentation component 604. Parallel ingestion pipelines with live media streams are shown at different stages of processing at 606, and 608. It is to be appreciated that while FIG. 6 illustrates one segmentation component 604 and one encryption component 602 in the ingestion infrastructure 104, this is done for simplicity, and each of the parallel ingestion pipelines can include segmentation components and master selection components.

Encryption component 602 can encrypt multicast streams within the communication channels or tunnels discussed above, such as the set of first communication tunnels 126, 128, 130 and 132, for example. The communication tunnels include GRE tunnels or other like tunnels that can be encrypted with IPSEC encryption for securing Internet Protocol (IP) communications by authenticating and encrypting each IP packet of a communication session, or encryptions for internet networking tunnels.

Segmentation component 302 can identify segment boundaries in an ingested input stream and then segment the input stream based on segment boundaries that can be identified within the ingestion agents 206 discussed herein. The segmentation component 302 can segment each of the parallel ingested input streams in each of the pipelines as well, or alternatively separate segmentation components can segment the separate input streams.

Figure 7:
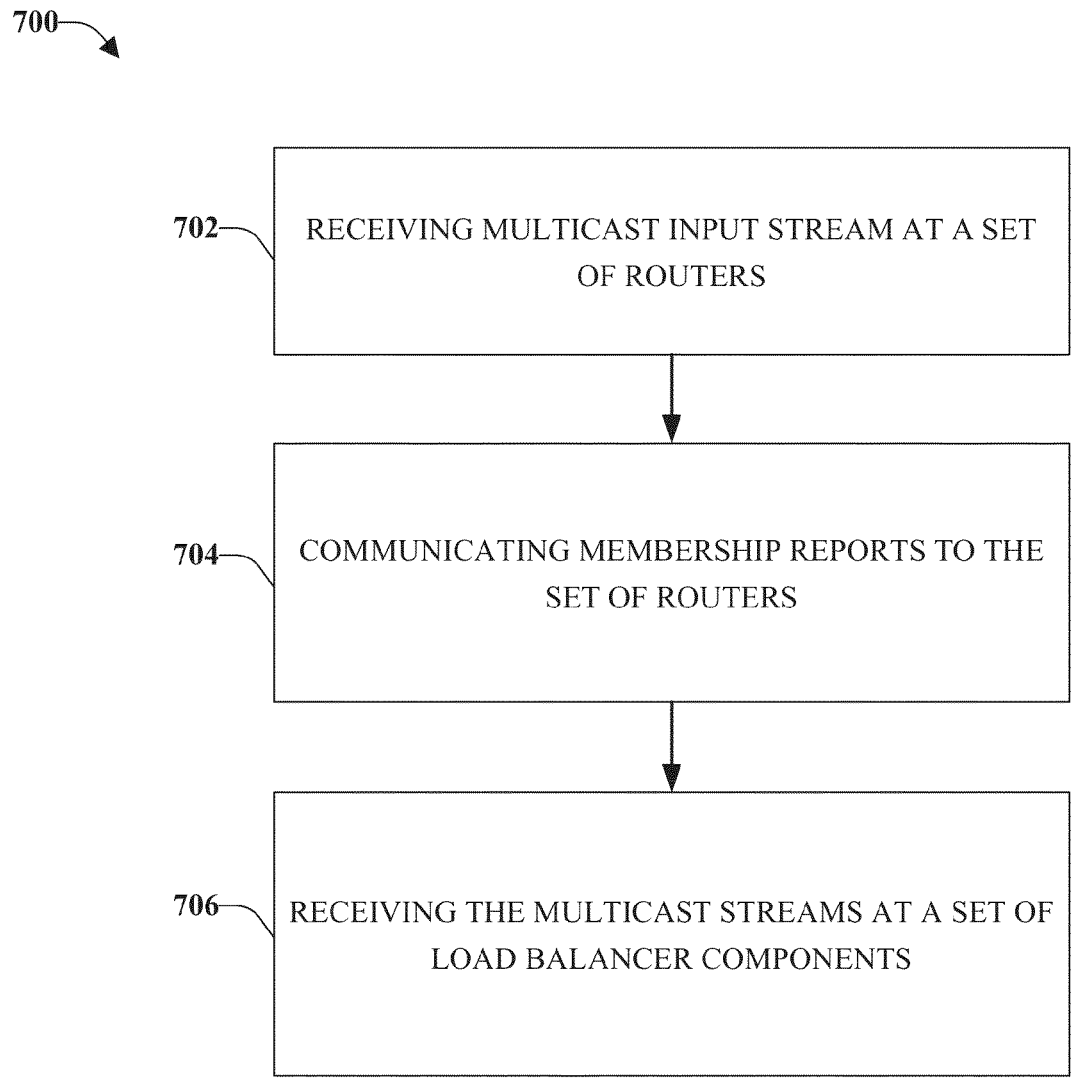
FIG. 7 illustrates a flow diagram of an example, non-limiting embodiment for processing input streams and selecting segments in accordance with various aspects and implementations described herein.

FIG. 7 illustrates an exemplary flow diagram 700 of an example non-limiting embodiment of a methodology for processing multicast input streams through a unicast channel network according to an aspect of the present disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in FIG. 1-6 can be and are intended to be implementable as methods and/or in accordance with the following depicted method.

At 702, multicast streams are received at a set of routers, which can reside at the edge of a multicast streaming network. At 704, a set of advertising components communicate membership reports to the set of routers, indicating a status of load balancer components for processing the multicast streams. At 706, the multicast streams are received at the set of load balancer components via a set of first communication tunnels established between the set of routers and the set of load balancer components, in which data flows through the tunnels in response to IGMP membership reports received by the router.

Figure 8:
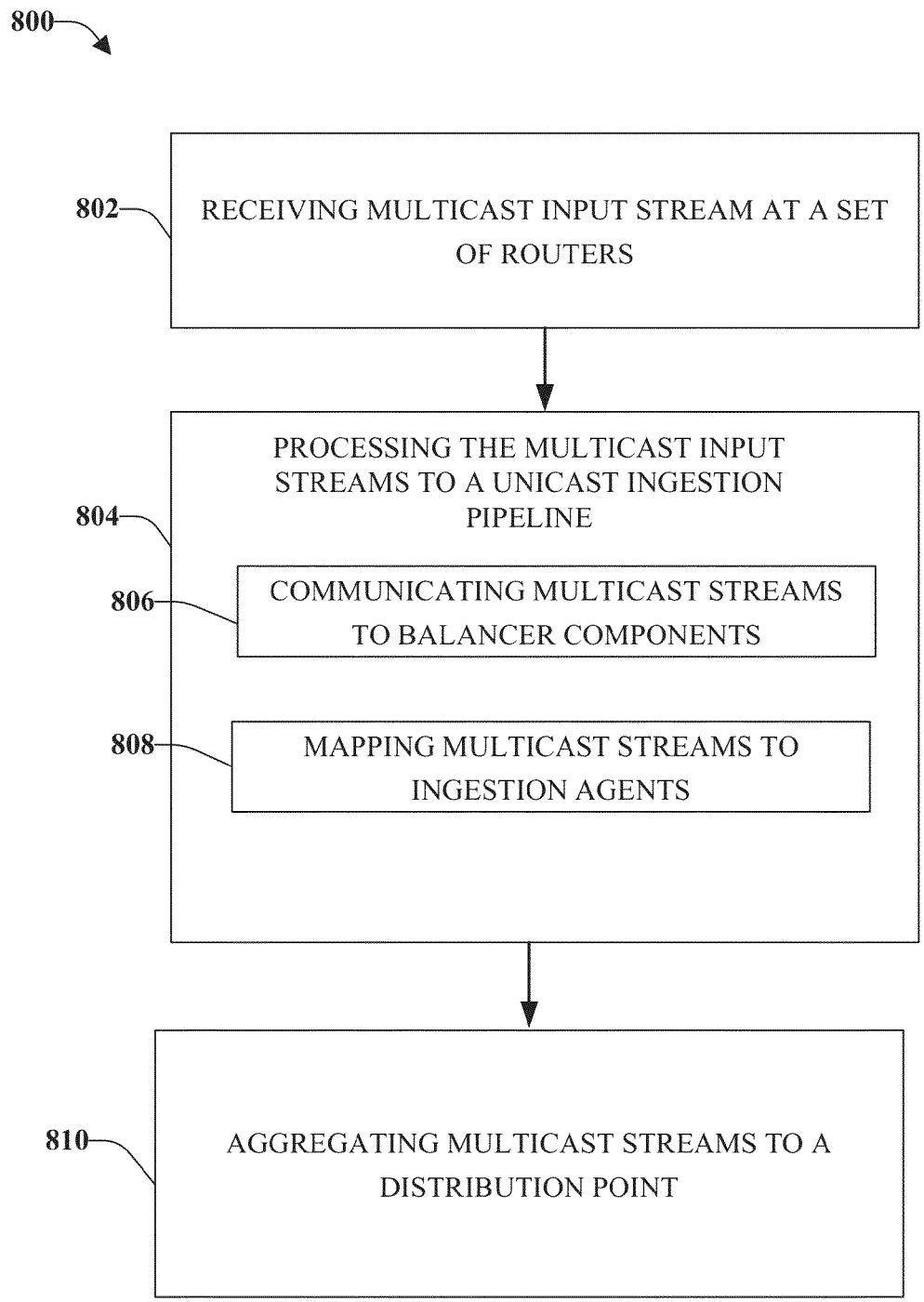
FIG. 8 illustrates a flow diagram of an example, non-limiting embodiment for processing input streams in accordance with various aspects and implementations described herein.

FIG. 8 illustrates a flow diagram of an example, non-limiting embodiment for segmenting input streams and selecting segments in accordance with various aspects and implementations described herein. It is to be appreciated that the detailed description of such acts in FIGS. 1-6 can be and are intended to be implementable as methods and/or in accordance with the following depicted method.

At 802, multicast streams (e.g., multicast UDP streams of video) are received at a set of routers. At 804, the multicast streams are processed in ingestion pipelines, in which communication of the streams through the pipelines can be directed through unicast communication channels, such as GRE tunnels or the like. An ingested input stream can be redundantly processed in separate ingestion pipelines. The ingested input stream can be mirrored between the separate ingestion pipelines. The separate ingested input streams can also be processed in parallel pipelines such that several levels of redundancy ensure that disruptions to one or more of the pipelines can be mitigated.

At 806, the multicast streams are communicated to a set of load balancer components. For example, the routers can open communication channels (e.g., GRE communication tunnels) to the load balancer components with separate Anycast VIP addresses. The routers can communicate multicast groups of streams based on membership reports received with status information of available load balancer components. Redundancy of the ingestion pipelines and of the load balancer components enables the redirection of the communications based on the status or membership reports.

At 808, the multicast streams are mapped to ingestion agents. The set of load balancer components can channel communication to an ingestion agent based on a forwarding table having status information of the ingestion agents. Based on the forwarding table, the load balancer components communicate and can redirect the multicast streams via a set of second communication tunnels (e.g., GRE tunnels).

At 810, the ingestion agents aggregate the multicast streams into chunks and direct the chunks to a storage or to a distribution point, which can be a distribution content network, a user device, etc.

Exemplary Computing Device

Figure 9:
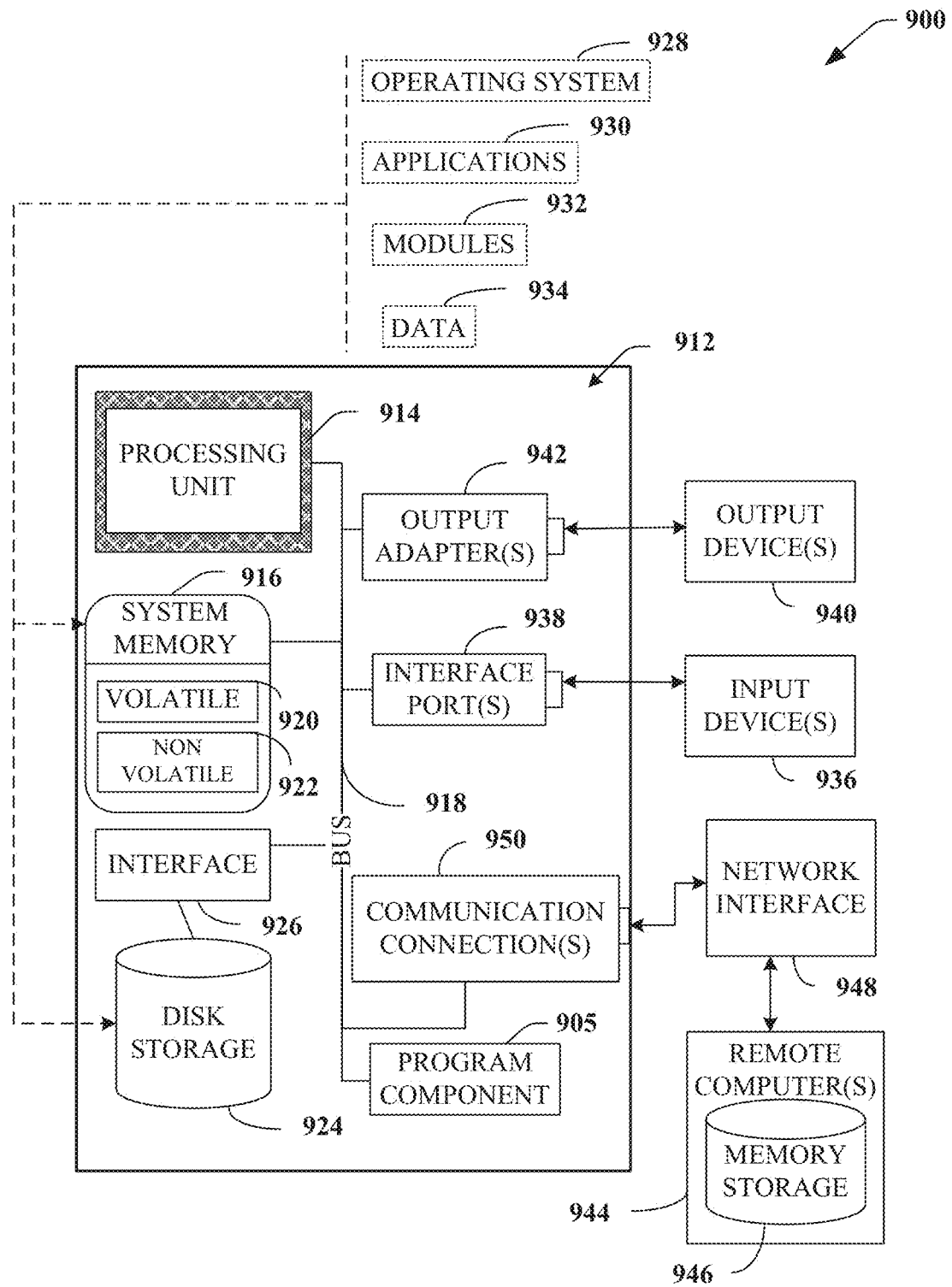
FIG. 9 is a block diagram illustrating an example computing device that is arranged in accordance with various aspects and implementations described herein.

With reference to FIG. 9, a suitable environment 900 for implementing various aspects of this disclosure includes a computing device 912. It is to be appreciated that the computer 912 can be used in connection with implementing one or more of the systems or component shown and described in connection with FIGS. 1-6. The computing device 912 includes a processing unit(s) 914, a system memory 916, and a system bus 918. The system bus 918 couples system components including, but not limited to, the system memory 916 to the processing unit 914. The processing unit(s) 914 can be any of various available processors. Dual microprocessors and other multiprocessor architectures also can be employed as the processing unit(s) 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 994), and Small Computer Systems Interface (SCSI).

The system memory 916 includes volatile memory 920 and nonvolatile memory 922. The basic input/output system (BIOS), containing the basic routines to transfer information between elements within the computing device 912, such as during start-up, is stored in nonvolatile memory 922. By way of illustration, and not limitation, nonvolatile memory (e.g., 922) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 920) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 912 can also include removable/non-removable, volatile/non-volatile computer storage media. FIG. 9 illustrates, for example, a disk storage 924. Disk storage 924 includes, but is not limited to, devices like a magnetic disk drive, flash drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computing device 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computing device 912 through input device(s) 936, and/or remotely over a communications network. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computing device 912 and to output information from computing device 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computing device 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computing device 912. For purposes of brevity, only a memory storage device 946 is illustrated with remote computer(s) 944. Remote computer(s) 944 is logically connected to computing device 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computing device 912, it can also be external to computing device 912. The hardware/software necessary for connection to the network interface 948 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 912 can be used to identify unauthorized uploaded content that is received before a live reference stream is ingested. Computing device 912 can also issue copyright infringement claims against the user uploaded content in response to determining the user uploaded content is unauthorized. As more fully disclosed herein, in some implementations, the computing device 912 can include one or more processors (e.g., 914) that can be used to process data, including processing data to perform various tasks (e.g., indexing uploaded content, matching validated live reference streams against the indexed uploaded content, identifying unauthorized uploaded content, issuing claims against the uploaded content, performing utility based analyses, etc.). The computing device 912 can include a program component 905 that can be associated with (e.g., communicatively connected to) the one or more processors. The program component 905 can contain, for example, a indexing component, a matching component, a purging component, and a claim component and/or other components, which can respectively function as more fully disclosed herein, to facilitate identifying matches between user uploaded media content and validated content and issuing copyright claims against the user uploaded media content when the user uploaded media content is uploaded first.

Exemplary Networked and Distributed Environments

Figure 10:
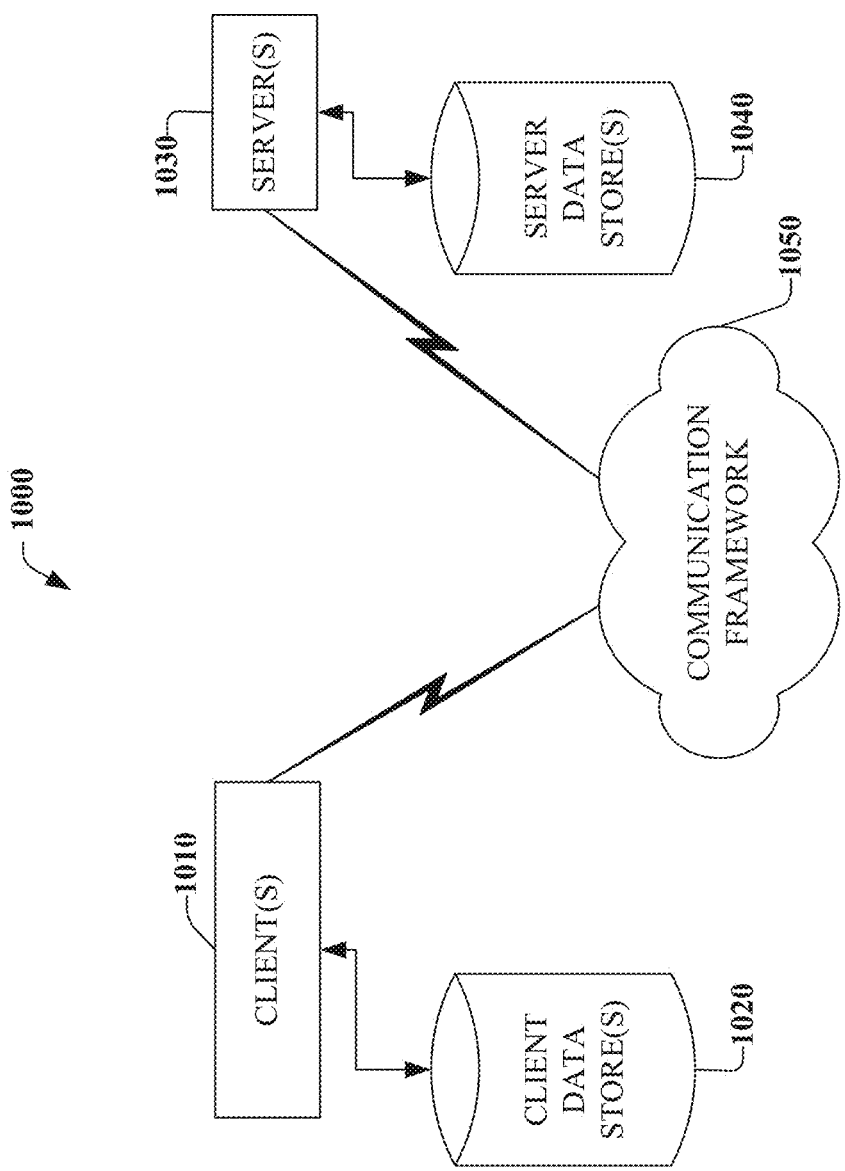
FIG. 10 is a block diagram illustrating an example networking environment in accordance with various aspects and implementations of this disclosure.

FIG. 10 is a schematic block diagram of a sample-computing environment 1000 in accordance with implementations of this disclosure. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a router, including a processor and memory, configured to:
receive at least one multicast stream from a content source in response to communicating an initial request to the content source;
receive membership reports from a set of advertising components, wherein the membership reports provide respective statuses indicating whether load balancer components of a plurality load balancer components are operable to receive and process the at least one multicast stream, and respective advertising components are distinct from and associated with subsets comprising two or more of the load balancer components;
open respective first communication tunnels to load balancer components having respective statuses indicative of being operable to receive and process the at least one multicast stream;
communicate, via the first communication tunnels, the at least one multicast stream to the load balancer components having respective statuses indicative of being operable to receive and process the at least one multicast stream;
wherein the respective first communication tunnels have floating end points configured to be shifted by a load balancer component to which a first communication tunnel ends to the router; and
terminate the first communication tunnel in response to a shift of a floating end point of the first communication tunnel to the router by the load balancer component.

2. The system of claim 1, wherein one or more advertising components share an address with one or more load balancer components of the plurality of load balancer components.

3. The system of claim 1, wherein the membership reports comprise Internet Group Management Protocol group membership reports.

4. The system of claim 1, wherein at least one advertising component of the set of advertising components is configured to generate membership reports on behalf of another advertising component of the set of advertising components in response to a failure of the other advertising component.

5. The system of claim 1, wherein the set of routers are further configured to assign a unique Anycast internet protocol address to each first communication tunnel.

6. The system of claim 1, wherein the set of advertising components monitor the respective statuses of the load balancer components of the plurality of load balancer components and redistribute the at least one multicast stream for each load balancer component having a status indicative of not being operable to receive and process the at least one multicast stream to a load balancer component having a different status.

7. The system of claim 1, wherein the multicast streams comprise multicast User Datagram Protocol video streams, and the set of first communication tunnels comprising Generic Routing Encapsulation tunnels that communicate encrypted multicast streams encrypted by an encryption component.

8. The system of claim 1, further comprising the plurality of load balancer components and a set of ingestion agents configured to concurrently process the at least one multicast stream.

9. The system of claim 8, wherein the plurality of load balancer components poll the set of ingestion agents to initiate the set of ingestion agents to respond with a response of multicast internet protocol groups for one or more multicast streams that each ingestion agent is capable of processing, and the plurality of load balancer components populates a forwarding table according to the response.

10. The system of claim 8, wherein the set of ingestion agents associates respective stream identifications to multicast streams for a real time multi-stream distribution.

11. The system of claim 8, wherein each ingestion agent of the set of ingestion agents reports a stream state to a stream controller for each stream received that includes current state and statistics of the multicast stream.

12. A method comprising:
receiving, by a router including a processor, at least one multicast stream;
receiving, by the router via a set of advertising components, membership reports comprising respective statuses indicating whether load balancer components of a plurality of load balancer components are functional to receive and process the at least one multicast stream, wherein respective advertising components are distinct from and associated with subsets comprising two or more of the load balancer components;
establishing, by the router, respective first communication tunnels to load balancer components having respective statuses indicative of being functional to receive and process the at least one multicast stream;
communicating, by the router via the first communication tunnels, the at least one multicast stream to the load balancer components having respective statuses indicative of being functional to receive and process the at least one multicast stream;
wherein the respective first communication tunnels have floating end points configured to be shifted by a load balancer component to which a first communication tunnel ends to the router from which the first communication tunnel originates; and
terminating, by the router, the first communication tunnel in response to a shifting of a floating end point of the first communication tunnel to the router by the load balancer component.

13. The method of claim 12, further comprising redistributing a work load of a load balancer component to another load balancer component of the plurality of load balancer components, upon an indication of a failure status for the load balancer component.

14. The method of claim 12, wherein one or more advertising components share an address with one or more load balancer components of the set of load balancer components.

15. The method of claim 12, further comprising:
processing, by at least one advertising component of the set of advertising components, membership reports on behalf of another advertising component of the set of advertising components in response to the other advertising component having a failure status.

16. The method of claim 12,
wherein each communication tunnel of the set of first communication tunnels terminates at a load balancer component.

17. The method of claim 12, further comprising:
forwarding via a set of second communication tunnels the at least one multicast stream to a set of ingestion components based on a forwarding table.

18. The method of claim 17, wherein the set of first communication tunnels and set second communication tunnels comprising Generic Routing Encapsulation tunnels.

19. The method of claim 12, further comprising:
assigning a unique Anycast internet protocol address to each communication tunnel of the set of first communication tunnels.

20. The method of claim 17, further comprising:
polling the set of ingestion agents to respond with responses of multicast internet protocol groups for one or more multicast streams that each ingestion agent is capable of processing; and
populating with the plurality of load balancer components the forwarding table according to the responses.

21. A non-transitory computer-readable medium having instructions stored thereon that, in response to execution, cause a router including a processor to perform operations comprising:
receiving at least one multicast stream;
receiving via a set of advertising components, membership reports comprising respective statuses indicating whether load balancer components of a set of load balancer components are functional to receive and process the at least one multicast stream, wherein respective advertising components are distinct from and associated with subsets comprising two or more of the load balancer components;
establishing respective first communication tunnels to load balancer components having respective statuses indicative of being functional to receive and process the at least one multicast stream;
communicating, via the first communication tunnels, the at least one multicast stream to the load balancer components having respective statuses indicative of being functional to receive and process the at least one multicast stream;
wherein the respective first communication tunnels have floating end points configured to be shifted by a load balancer component to which a first communication tunnel ends to the router from which the first communication tunnel originates; and
terminating the first communication tunnel in response to a shifting of a floating end point of the first communication tunnel to the router by the load balancer component.

22. The non-transitory computer-readable medium of claim 21, wherein one or more advertising components share an address with one or more load balancer components of the set of load balancer components.

23. The non-transitory computer-readable medium of claim 21, assigning a unique Anycast internet protocol address to each communication tunnel of the set of first communication tunnels.

* * * * *